(12) United States Patent
Pati et al.

(10) Patent No.: US 11,954,174 B2
(45) Date of Patent: Apr. 9, 2024

(54) SHARING FINANCIAL CRIME KNOWLEDGE

(71) Applicant: Actimize LTD., Ra'anana (IL)

(72) Inventors: Debabrata Pati, Pune (IN); Pravin Dahiphale, Pune (IN); Danny Butvinik, Haifa (IL)

(73) Assignee: ACTIMIZE LTD., Ra'anana (IL)

( * ) Notice: Subject to any disclaimer, the term of this patent is extended or adjusted under 35 U.S.C. 154(b) by 449 days.

(21) Appl. No.: 17/063,731

(22) Filed: Oct. 6, 2020

(65) Prior Publication Data

US 2022/0108133 A1 Apr. 7, 2022

(51) Int. Cl.
| | |
|---|---|
| G06F 16/25 | (2019.01) |
| G06F 18/214 | (2023.01) |
| G06F 21/62 | (2013.01) |
| G06N 3/045 | (2023.01) |
| G06Q 50/26 | (2012.01) |

(52) U.S. Cl.
CPC ........ G06F 18/2148 (2023.01); G06F 16/254 (2019.01); G06F 21/6245 (2013.01); G06N 3/045 (2023.01); G06Q 50/26 (2013.01)

(58) Field of Classification Search
CPC ............... G06F 18/2148; G06F 16/254; G06F 21/6245; G06N 3/045; G06Q 50/26
See application file for complete search history.

(56) References Cited

U.S. PATENT DOCUMENTS 10,482,466 B1 * 11/2019 Walters .............. G06Q 20/4016
11,244,321 B2 * 2/2022 Wu ........................ G06N 20/00
2020/0065813 A1 * 2/2020 Walters ..................... G06N 3/08
2020/0184212 A1 * 6/2020 Anthony Samy ...... G06N 20/20
2020/0210808 A1 * 7/2020 Dong ..................... G06N 3/084

(Continued)

OTHER PUBLICATIONS

Xu et al., "Modeling Tabular Data using Conditional GAN", Oct. 28, 2019, arXiv:1907.00503 [cs. LG], (Year: 2019).*

(Continued)

*Primary Examiner* — Hosain T Alam
*Assistant Examiner* — Robert F May
(74) *Attorney, Agent, or Firm* — SOROKER AGMON NORDMAN RIBA

(57) ABSTRACT

A computerized-method for scaling automatic deployment of a machine-learning detection model in a cloud-based managed analytics service by knowledge sharing to overcome an imbalanced dataset learning problem. The computerized-method includes: sending the received data to machine-learning models to synthesize patterns of the received data to yield a differential privacy data; maintaining in the database the differential privacy data of one or more on-prem cloud-based managed analytics services to generate a consortium shared synthetic data lake; operating phases of machine-learning detection model based on the received data and data in the database to create a packaged model. The data in the database is aggregated and used during the operating phases of the machine-learning detection model to create a packaged model for other on-prem cloud-based managed analytics services, thus overcoming imbalanced dataset learning thereof, and after the packaged model is created it is automatically deployed on-prem.

5 Claims, 7 Drawing Sheets

(56) References Cited

U.S. PATENT DOCUMENTS

2021/0374756 A1\* 12/2021 Pandey .................... G06N 3/08
2023/0118240 A1\* 4/2023 Wong .................... G06N 3/045
705/44

OTHER PUBLICATIONS

"Some Thoughts on the Applications of Deep Generative Models in Finance", Sep. 27, 2020, <https://gmarti.gitlab.io/quant/2020/09/27/thoughts-gans-finance.html> (Year: 2020).\*

Assefa et al., "Generating Synthetic Data in Finance: Opportunities, Challenges, and Pitfalls", Jul. 16, 2020, <https://www.jpmorgan.com/content/dam/jpm/cib/complex/content/technology/ai-research-publications/pdf-8.pdf> (Year: 2020).\*

\* cited by examiner

SHARING FINANCIAL CRIME KNOWLEDGE

TECHNICAL FIELD

The present disclosure relates to the field of neural networks and Generative Adversarial Networks (GAN)s, which are an approach to generative modeling using deep learning methods, such as convolutional neural networks.

BACKGROUND

Financial institutions including banks, brokerage firms and insurance companies are constantly under fraud attack and by law are required to fight money laundering. Accordingly, they monitor and report suspicious financial activities that may relate to fraud or money laundering and terrorist financing. However, the detection and the reports are mainly based on a local level which might not be as effective as it could be if it would have been performed in the international, regional and national levels to identify and stem the flow of illicit finance.

In other words, in current systems of financial institutions the detection and report of fraud and money laundering is based on patterns which were identified locally. Accordingly, given the fact that the variety of fraud and Anti Money Laundering (AML) patterns are flourishing as well as their complexity and uniqueness, there is a need for a system and method that may utilize shared financial crime knowledge in a national, regional and international level to detect financial crimes. For example, learning from financial crime such as fraud or AML data pattern across different consortium clients.

Therefore, there is a need for a system and method that will synthesize detected fraud patterns from one customer to be shared with another customer without exposing original data across the consortium clients by maintaining differential privacy of the data.

Moreover, current systems of the financial institutions use machine learning models to detect financial crime. These machine learning models are trained on historical data which includes historical fraud transactions as well as non-fraud transactions. However, typically, fraudulent transactions are rare compared to non-fraud transactions. Commonly, at max 2-3% of the historical data would be fraud transactions available for training the machine learning models. This class imbalance of fraud and non-fraud transactions poses a major problem during the training of the machine learning model to detect financial crime.

Therefore, there is also a need for a system and method that will help to reduce the class imbalance problem by sharing synthesized fraud patterns for training the machine learning model. Thus, by sharing synthesized fraud patterns between different clients, it will increase the fraud transaction percentage in the training data for each client which in turn may reduce the class imbalance problem.

SUMMARY

There is thus provided, in accordance with some embodiments of the present disclosure, a computerized-method for scaling automatic deployment of a machine learning detection model in a cloud-based managed analytics service by knowledge sharing, to overcome an imbalanced dataset learning problem.

In accordance with some embodiments of the present disclosure, in a computerized-system comprising a processor, a database and a memory, receiving by the processor data from an on-premise (on-prem) cloud-based managed analytics services where a machine learning detection model is to be automatically deployed.

Furthermore, in accordance with some embodiments of the present disclosure, the processor may be configured to send the received data to machine learning models to synthesize patterns of the received data to yield a differential privacy data. Maintain in the database the differential privacy data of one or more on-prem cloud-based managed analytics services to generate a consortium shared synthetic data lake and to operate phases of machine learning detection model based on: (i) the received data; and (ii) data in the consortium shared synthetic data lake, to create a packaged model.

Furthermore, in accordance with some embodiments of the present disclosure, the data in the database of consortium shared synthetic data lake may be aggregated and used during the operating phases of the machine learning detection model to create a packaged model for other on-prem cloud-based managed analytics services, thus overcoming imbalanced dataset learning thereof. The data in the database of consortium shared synthetic data lake may be aggregated from a plurality of on-prem cloud-based managed analytics services.

Furthermore, in accordance with some embodiments of the present disclosure, after the packaged model is created it may be automatically deployed on-prem.

Furthermore, in accordance with some embodiments of the present disclosure, the received data may be financial transaction data and the cloud-based managed analytics service may be continuously monitoring criminal typologies and operating fraud and Anti-Money Laundering (AML) model performance.

Furthermore, in accordance with some embodiments of the present disclosure, the synthesized patterns are related to financial crime.

Furthermore, in accordance with some embodiments of the present disclosure, the synthesized patterns of the received data are fraud patterns or AML patterns.

Furthermore, in accordance with some embodiments of the present disclosure, the machine learning models to synthesize the patterns of the received data are Conditional Table Generative Adversarial Networks (CTGAN).

Furthermore, in accordance with some embodiments of the present disclosure, the operated phases of the machine learning detection model include: (i) data validation; (ii) data preprocessing; (iii) data enrichment; (iv) data sampling; (v) feature engineering; (vi) model tuning and training; (vii) model testing; and (viii) model packaging.

Furthermore, in accordance with some embodiments of the present disclosure, the data in the consortium shared synthetic data lake to create a packaged model may be used in the data enrichment phase.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION

Figure 1:
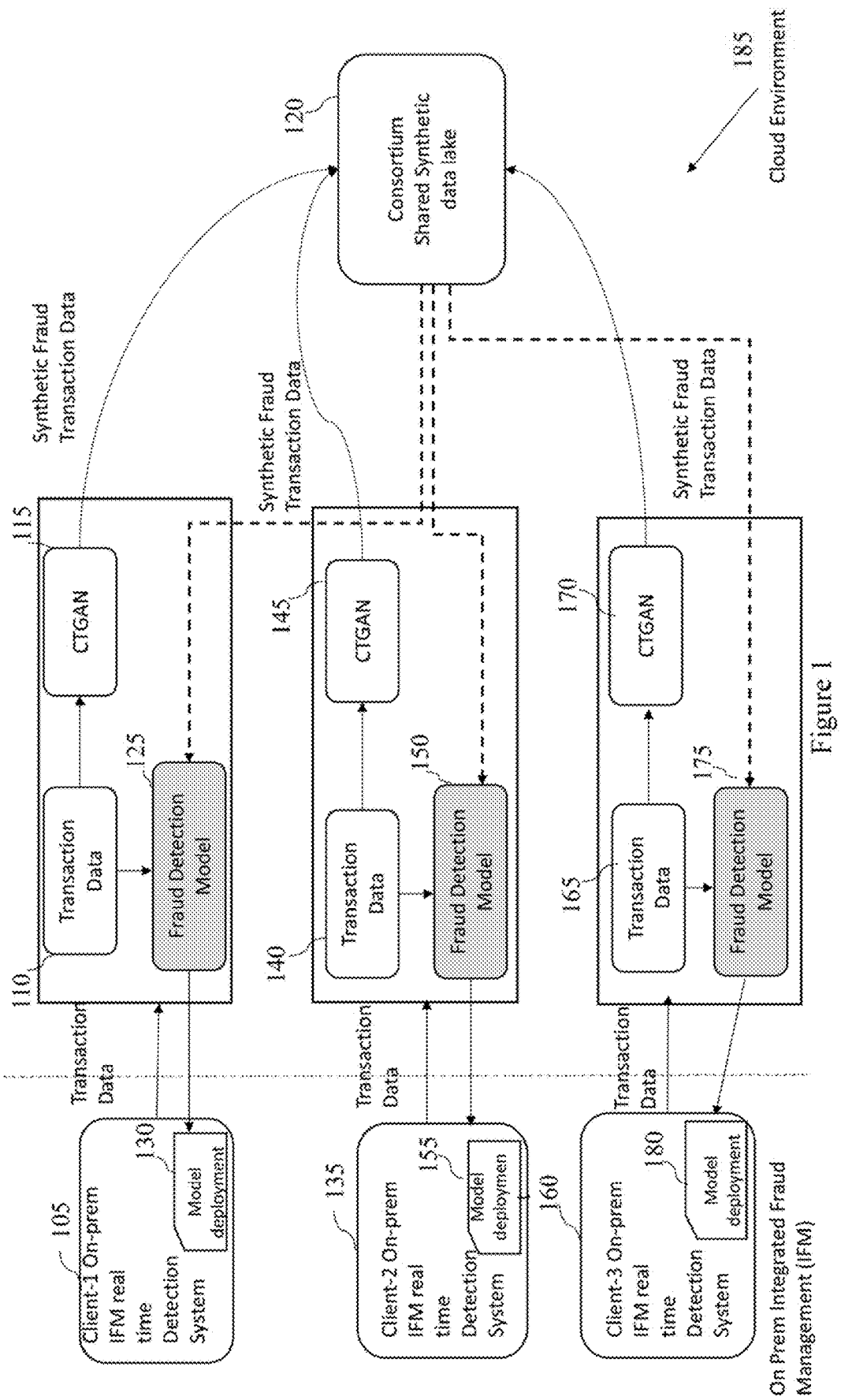
FIG. 1 schematically illustrates a high-level diagram of a system that implements a computerized-method for scaling automatic deployment of a machine learning detection model in a cloud-based managed analytics service by knowledge sharing, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

As used herein, the term "Differential Privacy" as used herein refers to publicly sharing information about a dataset by describing the patterns of groups within the dataset while withholding information about individuals in the dataset.

As used herein, the term "consortium shared synthetic data lake" as used herein refers to a centralized repository that allows to store all structured data at any scale.

As used herein, the term "Financial Institution (FI)" as used herein refers to a company engaged in the business of dealing with financial and monetary transactions such as deposits, loans, investments, and currency exchange. It has its's own transaction management system for maintaining user transaction.

As used herein, the term "fraud" refers to a crime of gaining money or financial benefits by a trick or by lying.

As used herein, the term "transaction" as used herein refers to an agreement, or communication, carried out between a buyer and a seller to exchange an asset for payment. It involves a change in the status of the finances of two or more businesses or individuals.

As used herein, the term "user" as used herein refers to an entity who is having authority and responsibility for enabling the flow of money transfer. A user may use one of the available channels such as digital or physical banking to initiate the transaction by putting the required details such as payee details and transaction amount, etc.

As used herein, the term "transaction channel" as used herein refers to a chain of businesses or intermediaries through which a money passes until it reaches the payee. Transaction channels can include ATM's, Mobile Banking Applications, Cheques or Internet Banking.

As used herein the term "class imbalance problem" as used herein refers to a distribution of two classes which occurs when one of the two classes having more samplings than other classes.

The term "primary client" as used herein refers to a client such as a financial institution that a machine learning detection model it to be automatically deployed on its on-prem Integrated Fraud Management (IFM) real-time detection system i.e., on-premise (on-prem) cloud-based managed analytics services.

The term "profiled data" as used herein refers to data that is aggregated data per preconfigured period, e.g., per day, per week, per 3 months and the like.

There is a growing consensus that the current global framework for fighting financial crime is not as effective as it could be, and that more needs to be done at the international, regional and national levels to help identify and stem the flow of illicit finance. The variety of fraud patterns are flourishing, as well, as their complexities and uniqueness. Currently, the detection of fraud patterns on the systems of one financial institution can't leverage its knowledge for the other financial institutions.

Accordingly, there is a need for a technical solution that will leverage all gained knowledge e.g., fraud patterns from as much as possible financial institutions, so it can be leveraged for automatic deployment of machine learning detection model in new financial institutions, thus scaling automatic deployment of a machine learning detection model in a cloud-based managed analytics service.

According to some embodiments of the disclosure, fraud patterns from different sources may be obtained, by distinct fraudsters on various data. Generative Adversarial Network (GAN) machine learning may be used to synthesize and create fraud data with anonymity without sharing actual data details of clients of the financial institutions. GAN is a generative modeling technique based on neural networks.

According to some embodiments of the disclosure, Conditional Table Generative Adversarial Networks (CTGAN) architecture which is a version of GAN may be implemented. CTGAN handles synthesizing of tabular data. The machine learning model learns the patterns in the real data and creates similar distribution in a synthetic dataset. CTGAN maintains the differential privacy in order to share the synthetic data publicly.

According to some embodiments of the disclosure, CTGAN adds noise to the synthetic data generated in order to make it difficult to break the differential privacy and learn the original patterns from synthetic data. The level of noise may also be adjusted to balance the discovered patterns in the data and amount of noise.

According to some embodiments of the disclosure, synthetic fraud data which has been generated by CTGAN may be combined with real fraud data from the financial institution on-prem system, e.g., on-premise (on-prem) cloud-based managed analytics services, thus increasing non-fraud vs. fraud ratio for training it and assisting in reducing the class imbalance problem of the financial institution data.

The generative model, i.e., CTGAN may be trained to generate new examples from the input domain, where the input, the random vector from the latent space, is provided with, i.e., conditioned by some additional input. The additional input could be a class value, such as fraud or non-fraud in the generation of financial transaction in the case of generating fraud patterns.

GANS can be extended to a conditional model if both the generator and discriminator are conditioned on some extra information 'y'. 'y' could be any kind of auxiliary information, such as class labels or data from other modalities. The conditioning may be performed by feeding 'y' into both the discriminator and generator as additional input layer.

According to some embodiments of the disclosure, Conditional Tabular GAN (CTGAN) is a GAN-based method to model tabular data distribution and sample rows from the distribution. In CTGAN, there is a mode-specific normalization to overcome the non-Gaussian and multimodal distribution. The conditional generator and training-by-sampling may be designed to deal with the imbalanced discrete columns. Fully connected networks may be used among other techniques to train a high-quality machine learning detection model.

According to some embodiments of the present disclosure, clients of financial institutions are commonly divided into segments according to similar attributes. The identified fraud patterns may also be divided in the consortium shared synthetic data lake to segments and may be used accordingly.

According to some embodiments of the disclosure, an automatic deployment of machine learning detection model in a new cloud-based managed analytics service, e.g., on-premise (on-prem) IFM real-time detection system, may be an automatic multi deployment of hundreds of machine learning detection models each model deployed on a new on-prem IFM real-time detection system. When there is an ability to deploy many models in one unit of time without the intervention of many data scientists it is called scalable production.

FIG. 1 schematically illustrates a high-level diagram of a system that implements a computerized-method for scaling automatic deployment of a machine learning detection model in a cloud-based managed analytics service by knowledge sharing, in accordance with some embodiments of the present disclosure.

According to some embodiments of the present disclosure, transaction data 110 may be sent from an on-prem cloud-based managed analytics services, such as on-prem IFM real-time detection system 105, of a first primary client, where a model is to be automatically deployed 130. The transaction data 110 may be utilized to the creation of a machine learning fraud detection model 125 and may be synthesized by Generative Adversarial Network (GAN) machine learning algorithm such as CTGAN 115 to synthesize and create fraud data with anonymity without sharing actual data details of respective client.

According to some embodiments of the present disclosure, CTGAN 115 may learn the fraud patterns in the real data and create similar distribution in synthetic dataset in multivariate form. The synthesized fraud patterns may maintain the differential privacy data in a database such as consortium shared synthetic data lake 120 without sharing or mixing the real transaction details.

According to some embodiments of the present disclosure, the phases of machine learning fraud detection model 125 may be operated based on: (i) the received data, i.e., transaction data 110; and (ii) data in the consortium shared synthetic data lake from other clients 120, to create a packaged model which later on may be automatically deployed 130.

According to some embodiments of the present disclosure, the data in the consortium shared synthetic data lake 120 may include patterns of fraud transactions.

According to some embodiments of the present disclosure, transaction data 140 may be sent from an on-prem cloud-based managed analytics services, such as on-prem IFM real-time detection system 135 of a second primary client, where a model is to be automatically deployed 155. The transaction data 140 may be utilized to the creation of a machine learning fraud detection model 150 and may be synthesized by GAN machine learning algorithm such as CTGAN 145 to synthesize and create fraud data with anonymity without sharing actual data details of respective client.

According to some embodiments of the present disclosure, CTGAN 145 may take the input data to be given with two types of columns. Continuous-columns columns that contain numerical values and which can take any value. Discrete-columns columns that only contain a finite number of possible values, whether these are string values or not.

The Code snippet 1 below illustrates: once the preprocessing and features are created, the data is imported and an instance of the CTGANSynthesizer class is created and is fit by passing data and the list of discrete columns. In this case numerical features have been created out of discrete columns, so no list is passed for same. Only the fraud data may be passed to the fit function to be analyzed and processed.

The process of fitting the data and internal GAN optimization takes some time to run to create a machine learning detection model such as 125, 150 and 175, and once the machine learning detection model is ready, the sample function may be called to produce a specified number of synthetic data.

Code Snippet 1
Generate Synthetic Data from Secondary Client's Fraud Data Using CTGAN

[82]: ctgan3=CTGANSynthesizer 0
ctgan3.fit(data3[data3.columns[: −1]], discrete_columns, epochs=5)
Epoch 1, Loss G: 5.6459, Loss D: −0.0802
Epoch 2, Loss G: 5.5717, Loss D: −0.1540
Epoch 3, Loss G: 5.1982, Loss D: −0.1517

Epoch 4, Loss G: 5.4190, Loss D: −01504
Epoch 5, Loss G: 5.2881, Loss D: −0.0255
[83]: sdata3=ctgan3.sample(data.shape[0])
sdata3['isFraud']=1
[109]: sdata3.shape
[109]: (2738, 10)

Code snippet 2 below illustrates: the synthetic fraud data that has been produced from a secondary client is then merged or added with actual fraud and clean data of primary client. This process of merging enhances the number of fraud data points, also the fraud patterns from second client, in synthetic form, may be added to the first client data, thus, enhancing fraud crime knowledge. A Catboost algorithm-based classifier may be used for classifying fraud from non-fraud/clean transactions. The model is trained on large sample of data (80%) and tested on remaining data as test data (20%).

Code Snippet 2
Merge Synthetic Fraud Data with Primary Client Data
[84]: sdata1=train_data sdata1 ['isFraud']=trains_labels
[85]: sdata1=pd.concat([sdata1, sdata3], axis=0)
[86]: np.unique(sdata1 ['isFraud'], return_counts=True)
[86]: (array([0, 1]), array([62999, 4654]))
Train Primary Client Model Using Own Data+Synthetic Fraud Data
[87]: strain_labels=sdata1.iloc[:, −1]
strain_data=sdata1.iloc[:, −1]
[97]: #smodel=CatBoostClassifier(iterations=1000, learning_rate=0.01, depth=4, early_stopping_rounds=50, eval_metric='F1', class_weights=[0.2, 0.8])
smodel=CatBoostClassifier(iterations=500, learning_rate=0.01, depth=4, early_stopping_rounds=50, eval_metric='F1', class_weights=[0.2, 0.8])
scb_cif=smodel.fit(strain_data, stain_labels, cat_features=cat_features, eval_set=(test_data2, test_labels2), plot=True, use_best_model=True, verbose_eval=False)
[98]: scb_clf.best_iteration_scb_clf.best_score_
[98]: (499, {'learn': {'log loss': 0.03877438894516499, 'F1': 0.9710616204399508}, 'validation': {Log loss: 0.0839151701775163, 'F1': 0.8386544342507646}})

According to some embodiments of the present disclosure, CTGAN 145 may learn the fraud patterns in the real data and accordingly may create similar distribution in synthetic dataset in multivariate form. The synthesized fraud patterns may maintain the differential privacy data of the second primary client in a database, such as consortium shared synthetic data lake 120, along with the data of the first client.

According to some embodiments of the present disclosure, the phases of machine learning fraud detection model 150 may be operated based on: (i) the received data, i.e., transaction data 140; and (ii) data in the consortium shared synthetic data lake 120, which now includes synthetic data from the First client and data from the second primary client, to create a packaged model which later on may be automatically deployed 155.

According to some embodiments of the present disclosure, transaction data 165 may be sent from an on-prem cloud-based managed analytics services, such as on-prem IFM real-time detection system 160, of a third primary client, where a model is to be automatically deployed 180. The transaction data 165 may be utilized to the creation of a machine learning fraud detection model 175 and may be synthesized by GAN machine learning algorithm such as CTGAN 170 to synthesize and create fraud data with anonymity without sharing actual data details of respective client.

According to some embodiments of the present disclosure, CTGAN 170 may learn the fraud patterns in the real data and create similar distribution in synthetic dataset in multivariate form. The synthesized fraud patterns may maintain the differential privacy data of the second client in a database such as consortium shared synthetic data lake 120 along with the data of the first client.

According to some embodiments of the present disclosure, the phases of machine learning fraud detection model 175 may be operated based on: (i) the received data, i.e., transaction data 165; and (ii) data in the consortium shared synthetic data lake 120, which now includes data from the first client, the second client and the third primary client, to create a packaged model which later on may be automatically deployed 180.

According to some embodiments of the present disclosure, the synthetic data in the consortium shared synthetic data lake 120 may assist the automate model deployment for each client and for each created model to learn new fraud patterns, which are unseen for itself, from other secondary clients using their synthetic fraud data. The combining of synthetic fraud data from other clients, i.e., financial institutions with real frauds of primary client, increases fraud Vs clean ratio for training/modeling and it helps greatly to reduce the class imbalance problem.

Figure 2:
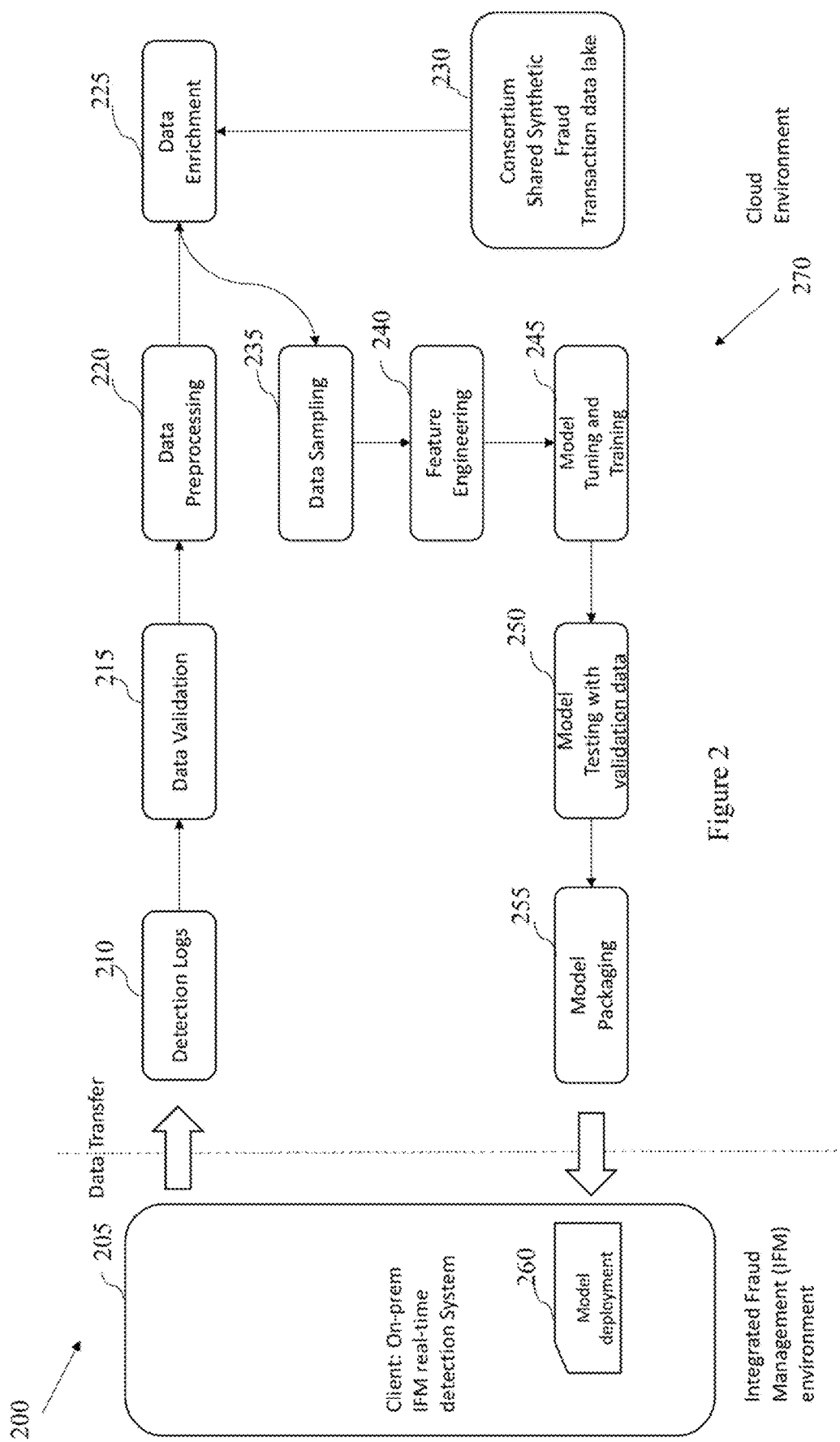
FIG. 2 schematically illustrates a high-level diagram of functional modeling flow, in accordance with some embodiments of the present disclosure.

FIG. 2 schematically illustrates a high-level diagram of functional modeling flow, in accordance with some embodiments of the present disclosure.

According to some embodiments of the present disclosure, an Integrated Fraud Management (IFM) real-time detection environment may be a detection environment such as IFM real time detection environment 200 having a system which run's on top of a financial organizations server. Every financial transaction that has been initiated by a user passes through it. The system may be a cloud-based managed analytics service, such as on premise (on-prem) IFM real-time detection system 205, which is a place where actual machine learning models run. The machine learning models could be classification or anomaly detection models for fraud identification and prevention. Every transaction is passed through this system.

According to some embodiments of the present disclosure, the system such as on-prem IFM real-time detection system 205 may be provided with transaction details such as account sender, beneficiary and other transaction details, which are related to fraud or AML detection process. Accordingly, the system 205 may evaluate and then may raise an alert for a financial transaction if it is classified or detected as suspicious. After an alert is being raised the transaction may be transferred to a Risk Case Management (RCM) Alert Manager for further evaluation, where an analyst manually checks the transferred financial transactions and makes a final decision if it is fraud or non-fraud. The financial transactions that were classified or detected by the IFM real-time detection system as clean go back to transaction management system for further processing.

According to some embodiments of the present disclosure, a machine learning deployed model, such as model deployment 260, may be a deployed model that is running on the on-prem IFM real-time detection system 205, through which, all financial transactions pass and it evaluates each financial transaction based on its feature values and provides an output risk score of the financial transaction. The deployed model may be a classification model or an anomaly detection model or may be a combination of both i.e., a hybrid model.

According to some embodiments of the present disclosure, the machine learning deployed model may evaluate a risk score of a financial transaction, based on preconfigured thresholds, which were identified during the modeling stage in the cloud environment 270, for example, phases of machine learning detection model building 210 through 255. If the risk score is greater than the preconfigured thresholds, then the financial transaction may be marked as fraud and may be blocked and shared to RCM Alert manager for further analysis. If the financial transaction risk score is less than a threshold then it is sent back to bank/FI transaction management system for further processing.

According to some embodiments of the present disclosure, the Risk Case Management (RCM) alert manager (not shown) may be a user interface where the alerts, which were raised by the machine learning deployed model, may be evaluated manually. An analyst may observe the financial transaction with the output values provided by the on-prem IFM real-time detection system 205 and manually determine if it is fraud or clean. The results of the analyst observations may be extracted as fraud files and then later may be manually sent back to the model building environment 270.

According to some embodiments of the present disclosure, detection logs 210 may be data that has been logged in a data logger, which is a process of logging the financial transaction data along with the run time calculated fields and model risk score with respect to those transactions. This data may include the profiled data with respect to the transaction's base activity. Base activity means the way that a financial transaction has occurred. For example, it might be between financial institutions of different kinds e.g., retail banks, commercial banks, central banks, etc. Transactions may be external or internal, through mobile, WEB, ATM, etc. A base activity may be a Mobile International Transfer or a Phone P2P Transfer. The Machine learning models may be built per base activity. Meaning, an adjustability of a specific model per specific base activity.

According to some embodiments of the present disclosure, the data may be collected from the on-prem IFM real-time detection system 205 and sent to the model building system in the cloud model building environment 270, for example, phases of machine learning detection model building 210 through 255, for further model creation and fine-tuning.

According to some embodiments of the present disclosure, a development platform may be a platform where actual model building takes place. The received data, such as detection logs 210, has been aggregated and made available to data scientists for further development. As a part of model development, there are certain phases which execute sequentially to complete the model building process. This is a cloud-based model development platform where all transaction logs and fraud tagged data is received for modeling purpose.

According to some embodiments of the present disclosure, data validation 215 may be operated on the received data, i.e., detection logs 210, to yield validated data as per some predefined schemas, which assures the data completeness. The fields which are specifically required to the model building process e.g., the operated phases of the machine learning detection model 210 through 255, may be checked and in case of missing attributes, the whole data may get reimported with the missing fields.

According to some embodiments of the present disclosure, data preprocessing 220 may be pre-processing operations such as cleaning, removal of corrupted and unwanted data, and data type correction. After all of these pre-processing operations, the data gets uploaded to a new location where it is available for further processing.

According to some embodiments of the present disclosure, data enrichment 225 may be the activities which enrich the data and make it more representative. The initial activity is fraud tagging which involves the tagging of the transactions in the detection logs 210 with respect to the fraud transactions provided in fraud files. This tagged data is further used for the enrichment, which involves the domain-based enrichment techniques. Furthermore, data from the consortium shared synthetic data lake 230 or 120 in FIG. 1, may be integrated in the data enrichment 225 as demonstrated below by code snippet 2.

According to some embodiments of the present disclosure, once fraud enrichment patterns has been performed, it may be used as labeled data for training the fraud machine learning detection models. Since there is plenty of non-fraudulent transactions, and original fraud transaction combined with synthetic fraud transaction the problem of imbalance between fraudulent transactions and non-fraudulent transactions may be improved.

Accordingly, the balance between fraud transactions and non-fraud transactions improves the performance of the machine learning detection model and makes it much more precise and accurate. The consortium shared synthetic data lake may enrich the original fraud transactions. An ideal balance for the machine learning detection model may be 50%-50% balance between fraud and non-fraud. The consortium shared synthetic data lake may augment such balance.

According to some embodiments of the present disclosure, data sampling 235 may be the process of selecting a sample data to build the machine learning model from the whole available data. Generally, preferred sampling strategies are time-based sampling, stratified sampling, random sampling and hybrid of mentioned strategies. The sample should be such that it represents the population i.e., whole transaction data behavior.

According to some embodiments of the present disclosure, the fraud patterns from one customer may be synthesized to be shared with other customers for learning purposes. The fraud patterns may be stored in a consortium shared synthetic fraud transaction data lake 230, which maintains differential privacy of data without exposing original data across the consortium clients.

According to some embodiments of the present disclosure, actual fraud data which has been received as detection logs 210 and then has been validated 215 and pre-processed 220 for which the machine learning model is to be trained on, may be combined with synthesized fraud data from the consortium shared synthetic fraud transaction data lake 230.

According to some embodiments of the present disclosure, the synthetic data may assist the model 260 to be deployed automatically in the on-prem IFM Real-Time detection system 205, to learn new frauds from other secondary clients using their synthetic fraud data. By combining fraud synthetic data from other on-prem systems with real fraud data, increasing non-fraud vs fraud ratio for training and it may assist in reducing the class imbalance problem, which is the imbalance between fraud class and non-fraud class.

According to some embodiments of the present disclosure, feature engineering 240 may by the process of engineering the extracts from the available data, which represents the transaction's truthfulness. Generally, date time-based features such as transaction hour, transaction amount and location, etc. are the valuable features in the financial institutions' context. In the process of engineering, a feature that represents the behavior of the financial transactions with respect to the modeling objective may be created to be further used to train the model.

According to some embodiments of the present disclosure, model tuning and training 245 may be the process of fitting the engineered features, which were received from feature engineering 240, to the model so that the algorithm of the machine learning model may learn effectively and may easily classify incoming transaction as a fraud or non-fraud based on risk score. The training process is performed on the train data which is a sub-sample of the initial sampled data. It also involves the tuning and optimization phases which fine-tunes the model 260 to be deployed automatically in the on-prem IFM real-time detection system 205 and optimizes its performance.

According to some embodiments of the present disclosure, model testing with validation data 250 may be an evaluation of the model 260 to be deployed automatically in the on-prem IFM real-time detection system 205, after it has been trained using unseen data named validation data. The validation data may be a subset of initial sampled data. The prediction results of the model on the validation data may indicate the model performance and its robustness. In case the results are not up to the mark, the process of training of the model may restart.

According to some embodiments of the present disclosure, model packing 255 may be a stage after the model testing with validation data 250 when the model has performed as expected, it is selected and packaged as an executable using the utility for model deployment 260 in a production environment such as on-prem IFM real-time detection system 205. The model packing 255 may involve all the steps which were performed on raw data until the model predicts the transactions labels e.g., fraud or non-fraud by the time a chronological order i.e., the time the financial transactions have arrived in the system.

According to some embodiments of the present disclosure, the transaction server makes a call to the machine learning detection model per each transaction, along with the necessary input data and prediction results are been returned as a result with respect to that transaction.

Figure 3:
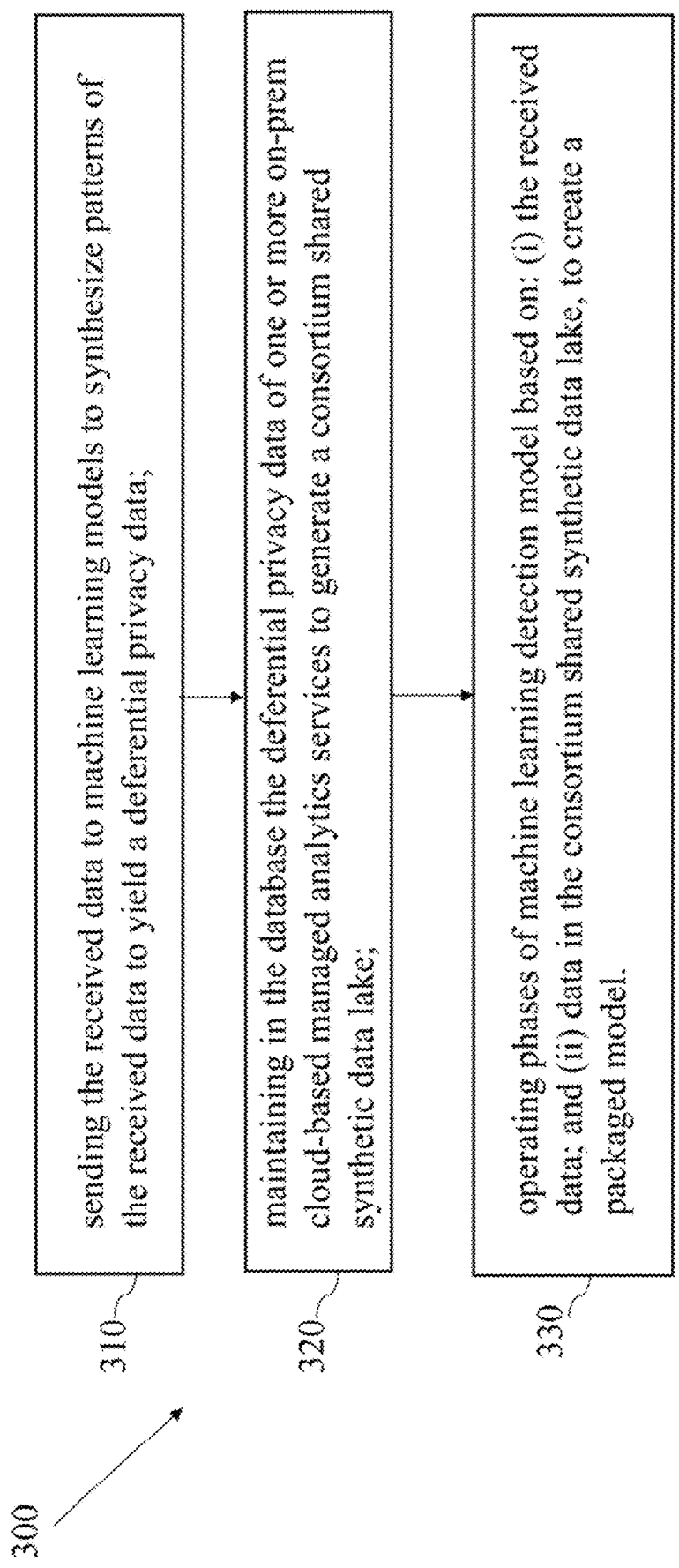
FIG. 3 is a flowchart of a computerized-method for scaling automatic deployment of a machine learning detection model in a cloud-based managed analytics service by knowledge sharing, to overcome an imbalanced dataset learning problem, in accordance with some embodiments of the present disclosure.

FIG. 3 is a flowchart of a computerized-method for scaling automatic deployment of a machine learning detection model in a cloud-based managed analytics service by knowledge sharing, to overcome an imbalanced dataset learning problem, in accordance with some embodiments of the present disclosure.

According to some embodiments of the present disclosure, in a computerized-system comprising a processor, a database and a memory, receiving by the processor data from an on-premise (on-prem) cloud-based managed analytics services where a machine learning detection model is to be automatically deployed. For example, the machine learning detection model that is to be automatically deployed may be model deployment 130, 155 and 180 in FIG. 1. The on-premise (on-prem) cloud-based managed analytics services may be on-prem Integrated Fraud Management (IFM) 105, 135 and 160 in FIG. 1

According to some embodiments of the present disclosure, operation 310 may comprise sending the received data to machine learning models to synthesize patterns of the received data to yield a differential privacy data. For example, the received data may be transaction data and machine learning models to synthesize patterns of the received data to yield a differential privacy data may be CTGAN 115, 145 and 170 in FIG. 1

According to some embodiments of the present disclosure, operation 320 may comprise maintaining in the database the differential privacy data of one or more on-prem cloud-based managed analytics services to generate a consortium shared synthetic data lake. For example, the consortium shared synthetic data lake may be consortium shared synthetic data lake 120 in FIGS. 1 and 230 in FIG. 2.

According to some embodiments of the present disclosure, operation 330 may comprise operating phases of machine learning detection model based on: (i) the received data; and (ii) data in the consortium shared synthetic data lake, to create a packaged model. For example, the operated phases of machine learning detection model may be phases 210 through 255 in FIG. 2 and phases 475, 480, 445, 460, 455, 450, 465 and 470 in FIG. 4.

Figure 4:
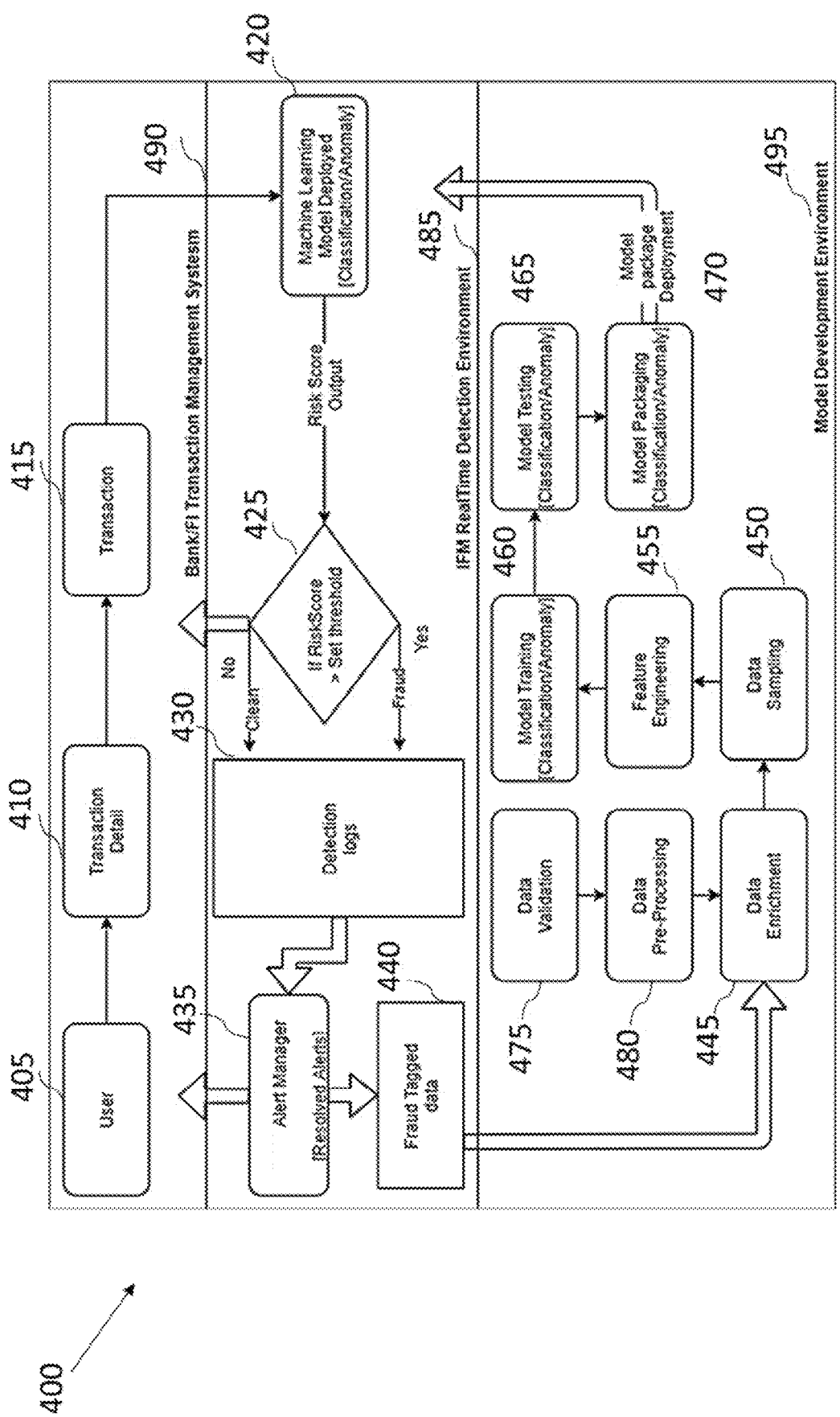
FIG. 4 is a high-level diagram of a model development environment, in accordance with some embodiments of the present disclosure.

FIG. 4 is a high-level diagram of a model development environment 400, in accordance with some embodiments of the present disclosure.

According to some embodiments of the present disclosure, the development environment 400 may be a cloud environment, such as cloud environment 185 in FIG. 1 and cloud environment 270 in FIG. 2.

According to some embodiments of the present disclosure, a Financial Institution (FI) is a company engaged in the business of dealing with financial and monetary transactions such as deposits, loans, investments, and currency exchange. It has its's own financial transaction management system such as bank/FI transaction management system 490, for maintaining users' financial transactions. A financial transaction is an agreement, or communication, carried out between a buyer and a seller to exchange an asset for payment. It involves a change in the status of the finances of two or more entities e.g., businesses or individuals.

According to some embodiments of the present disclosure, a user 405 may be an entity who is having authority and responsibility for enabling the flow of money transfer. A user 405 may use one of the available channels, such as digital or physical banking, to initiate the financial transaction 415 by putting the required details 410 such as payee details and transaction amount, etc. A financial transaction channel is a chain of businesses or intermediaries through which money passes until it reaches the payee. Transaction channels can include ATM's, Mobile Banking Applications, Cheques or Internet Banking. Accordingly, the financial transaction management system such as bank/FI transaction management system 490 may forward the financial transaction 415 to an Information Maintenance (IFM) real-time detection environment, such as IFM real-time detection environment 485 and on-prem IFM real-time detection system 205 in FIG. 2 and on-prem IFM real-time detection systems 105, 135 and 160 in FIG. 1, which is a system that runs on top of financial organizations servers and every financial transaction that is initiated by a user is passing through it and being processed by it.

According to some embodiments of the present disclosure, the IFM real-time detection environment, such as real-time detection environment 485 and on-prem IFM real-time detection system 205 in FIG. 2 and on-prem IFM real-time detection systems 105, 135 and 160 in FIG. 1 may include a machine learning model that is deployed in the financial transaction management system 420 for classification of the financial transaction or for anomaly detection may calculate and attribute a risk score to the financial transaction 415 according to its details 410.

According to some embodiments of the present disclosure, an IFM real-time Detection System is the place where the machine learning models run. The machine learning models could be classification or anomaly detection models for fraud identification and prevention. Every financial transaction may pass through this system, and with the help of the account sender, beneficiary and other financial transaction details for detection process, it evaluates and raises an alert for a financial transaction if found as suspicious. The financial transaction management system is Machine Learning Deployed model(s) 420 which is the deployed model such as model deployment 260 in FIG. 2 and model deployment 130, 155 and 180 in FIG. 1 through which, all the financial transactions pass and being evaluated based on values of its features to provide each financial transaction a risk score.

According to some embodiments of the present disclosure, the Machine Learning Deployed model such as model deployment 260 in FIG. 2 and model deployment 130, 155 and 180 in FIG. 1 may be a classification model or an anomaly detection model or a combination thereof e.g., a hybrid model. The financial transactions which are found clean go back to financial transaction management system for further processing. Then, the raised alert is being transferred to the Alert Manager 435 for further evaluation and analysis where an analyst manually checks the financial transactions and makes the final decision about it by tagging data as fraud 440.

According to some embodiments of the present disclosure, in case the attributed risk score is above a preconfigured threshold 425 the financial transaction is marked as fraud and blocked. If the risk score is below the preconfigured threshold it is marked as clean. The marked transactions may be stored in detection logs 430 and 210 in FIG. 2. A financial fraud is the crime of gaining money or financial benefits by deception or criminal activity. If the financial transaction risk score is less than threshold then it's sent back to bank/FI transaction management system 490 for further processing.

According to some embodiments of the present disclosure, the Alert manager 435 refers to an application having a user interface, where the alerts are evaluated manually by an analyst that observes the financial transaction details 410 along with the output values provided by the detection system and manually marks it as a fraud or clean. The results may be extracted as fraud files and then sent back to the model building environment.

According to some embodiments of the present disclosure, the detection logs 430 and 210 in FIG. 2 refer to the data which is a result of the process of logging the financial transaction data along with the run-time calculated fields and model risk score with respect to the financial transactions. This data mainly comprises the profiled data with respect to the transaction's base activity. The Data is being collected and sent to the model development environment 495 for the further model creation.

According to some embodiments of the present disclosure, the model development environment such as model development environment 495, may be a platform where actual model building is performed. The received data may be aggregated and made available to the data scientists for further development. As a part of the model development, there are certain phases which are being executed sequentially to complete the model building process. This platform may be cloud based and all the financial transaction logs such as detection logs 430 or 210 in FIG. 2 and fraud tagged data 440 may be received for modeling purpose.

According to some embodiments of the present disclosure, an operation of a data validation 475 or 215 in FIG. 2 may be performed when the received data may be collected and validated as per some predefined configuration which assures the data completeness. The fields which are required specific to the model building e.g., anomalous related features may be checked and in case of missing attributes, the whole data gets reimported with the corrected or missing fields.

According to some embodiments of the present disclosure, an operation of data pre-processing 480 or 220 in FIG. 2 may be performed. The data pre-processing 480 or 220 in FIG. 2 may include steps such as data cleaning, removal of corrupted and unwanted data, and data type correction. Then, the data may be uploaded for further processing.

According to some embodiments of the present disclosure, an operation of data enrichment 445 or 225 in FIG. 2 may be performed. The data enrichment 445 may include all the activities which enrich the data and make it more representative to the data as a whole. The initial activity may be fraud tagging which includes tagging the financial transactions which were received in detection logs, such as detection logs 430 or 210 in FIG. 2, with respect to the fraud transactions provided in fraud files. Tagged data such as fraud tagged data 440, may be further used for the data enrichment operation 445 or 225 in FIG. 2 which includes the domain-based i.e., relevant enrichment techniques. Furthermore, data from the consortium shared synthetic data lake 230 or 120 in FIG. 1 may be integrated in the data enrichment 225 as described above.

According to some embodiments of the present disclosure, an operation of data sampling 450 or 235 in FIG. 2 may be performed. The data sampling 450 may include the process of selecting the sample data to build the machine learning model from the whole available data. Preferred data sampling strategies are time-based sampling, stratified sampling, random sampling and hybrid of mentioned strategies. The data sample should be such that it should represent the population i.e., whole data, behavior.

According to some embodiments of the present disclosure, an operation of feature engineering 455 or 240 in FIG. 2 may be performed. The feature engineering 455 is a significant stage in the model development process. The feature engineering operation 455 may include the process of engineering the extracts from the available data which represents the financial transaction's truthfulness. In a non-limiting example, the features may be date and time-based features, such as transaction hour, transaction amount, location, etc. are the anomalous related features in the context of the financial institutions because they represent the behavior of financial transactions more clearly with respect to the modeling objective. The features may be created and may be used further to train the model.

According to some embodiments of the present disclosure, an operation of model training 460 or 245 in FIG. 2 may be performed. The model training operation 460 may include the process of fitting the engineered features to the model so that the Machine Learning (ML) model may learn them effectively and may be able to easily classify an incoming financial transaction as a fraud or non-fraud based on a risk score. The ML model training operation 460 may be performed over training data which may be a sub-sample of the initial sampled data. It also includes the tuning and optimization phases which fine-tune the model and optimize its performance.

According to some embodiments of the present disclosure, an operation of model validation, i.e., model testing 465 or 250 in FIG. 2 may be performed. The ML model testing 465 of the ML model classification or anomaly detection, may be performed after the ML model gets trained, the performance of ML model may be evaluated using unseen data which is validation data. The validation data may be a subset of the initial sampled data. Prediction results on the validation data may measure the model performance and its robustness. If results are not up to the mark, the model training may start again.

According to some embodiments of the present disclosure, after prediction results on the validation data are matching the yielded results an operation of packaging and deployment 470 in a production environment may be performed.

According to some embodiments of the present disclosure, the operation of packaging and deployment 470 may include packaging the ML model as an executable and deploying it in production environment. A transaction server (not shown) may call the deployed executable and provide it with the necessary input data with required features, that is related to a financial transaction to receive prediction results i.e., anomaly detection and classification score with respect to the financial transaction. The necessary input data i.e., required input features may be learnt during model training process.

According to some embodiments of the present disclosure, whenever a user 405 initiates a financial transaction 415 via a channel, the transaction 415 may pass through the bank/FT transaction management system such as bank/FI transaction management system 490 and may be forwarded to a real-time detection system. Once the mode package is deployed in the production environment, 260 in FIG. 2 or 130, 155 and 180 in FIG. 1, a live transaction may pass through the same for risk detection. The master data may pass through the initial pre-processing and feature engineering logic in order to clean the data and generate the necessary features out of it.

According to some embodiments of the present disclosure, the probabilistic features i.e., anomalous related features may be created in the feature engineering stage 455 or 240 in FIG. 2. The newly generated anomalous related features along with some existing features may go through model object and predictions may be returned in response. Based on the prediction results an alert may be raised and sent to a respective front-end system for further investigation.

Figure 5:
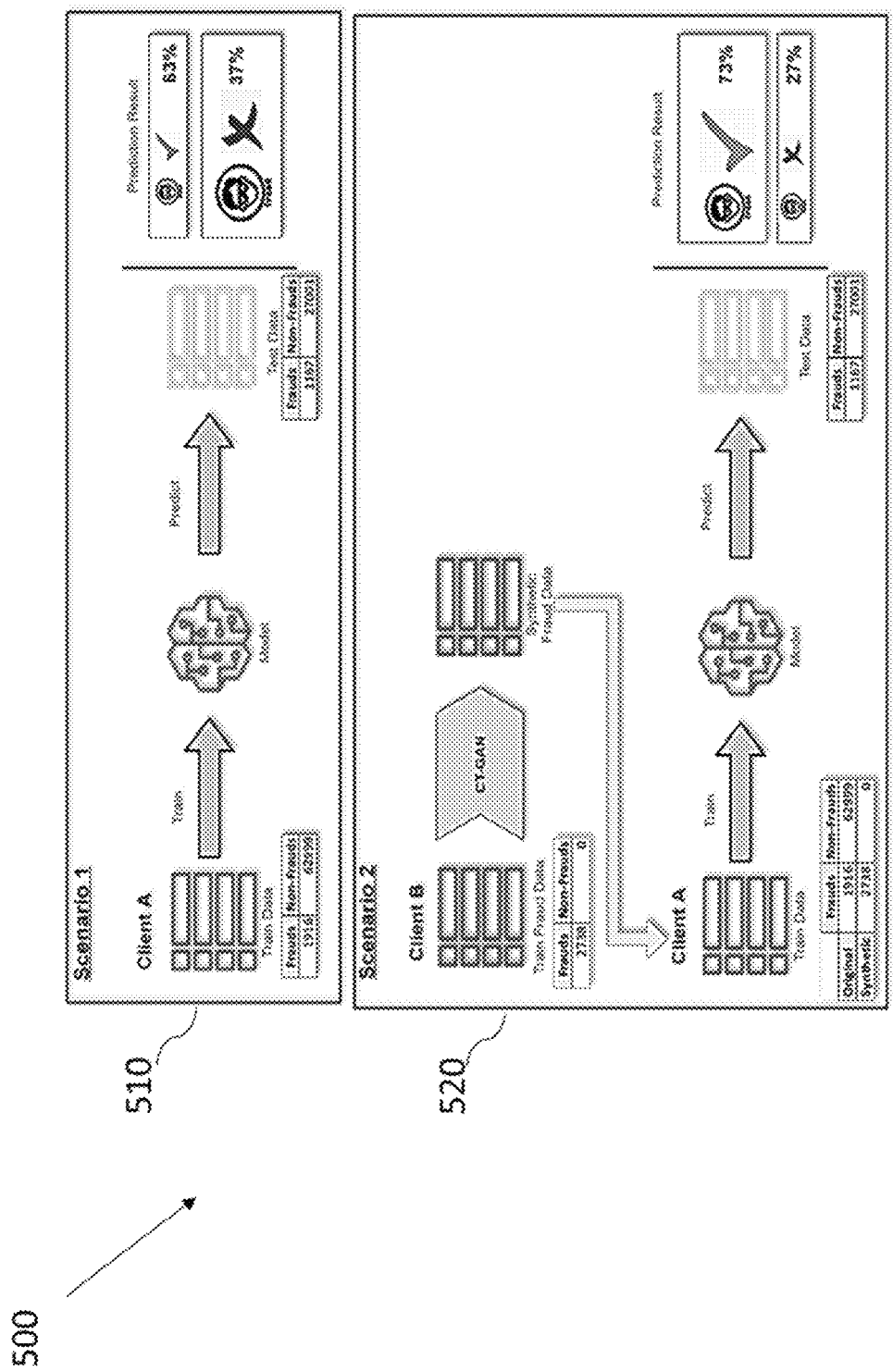
FIG. 5 is a diagram which illustrates the prediction results when a client uses only its own data and the prediction results when the client uses its own data combined with synthesized data of another client, in accordance with some embodiments of the present disclosure.

FIG. 5 is a diagram 500 which illustrate the prediction results when a client uses only its own data and the prediction results when the client uses its own data combined with synthesized data of another client, in accordance with some embodiments of the present disclosure.

According to some embodiments of the present disclosure, to simulate prediction results, Proof of Concept (POC) may be performed using PaySim which is using aggregated data from the private dataset to generate a synthetic dataset that resembles the normal operation of the transactions and injects malicious behavior for later evaluation of the performance of fraud detection methods. PaySim simulates mobile money transactions based on a sample of real transactions which were extracted from one month of financial logs from a mobile money service implemented in an African country. The original logs were provided by a multinational company, who is the provider of the mobile financial service which is currently running in more than 14 countries all around the world.

According to some embodiments of the present disclosure, data from different time periods have been sampled as Client-A and Client-B data. Data may consist of fraud and clean data. Training may be performed by using Catboost classification algorithm for fraud prediction. CatBoost is a machine learning algorithm that uses gradient boosting on decision trees. It is available as an open source library.

According to some embodiments of the present disclosure, according to scenario 510 when the detection machine learning model may train on Client-A train data and predict on Client-A test data without synthetic fraud patterns from other clients. The results were: 63% detection of frauds in test data.

According to some embodiments of the present disclosure, according to scenario 520 generated synthetic fraud data from Client-B using CTGAN algorithm such as CTGAN 115, 145 and 170 in FIG. 1. The synthetic data have been mixed with Client-A training data model training on mixed train data and predicted on Client-A test data. The results were: 73% detection of frauds in test data.

Figure 6:
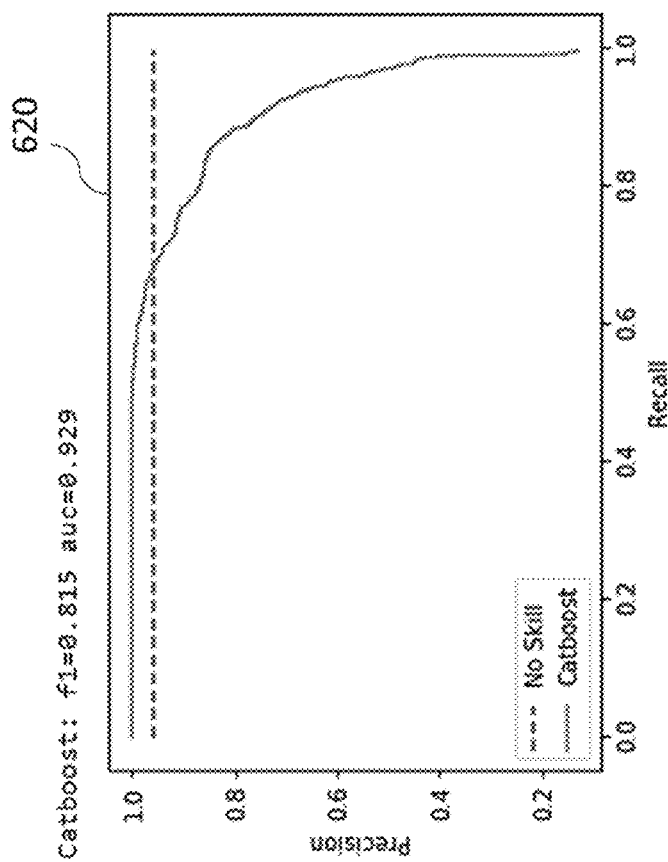
FIG. 6 shows the result of an experiment and evaluates the performance of the computerized-method for scaling automatic deployment of a machine learning detection model in a cloud-based managed analytics service by knowledge sharing, to overcome an imbalanced dataset learning problem, in accordance with some embodiments of the present disclosure.
Figure 6:
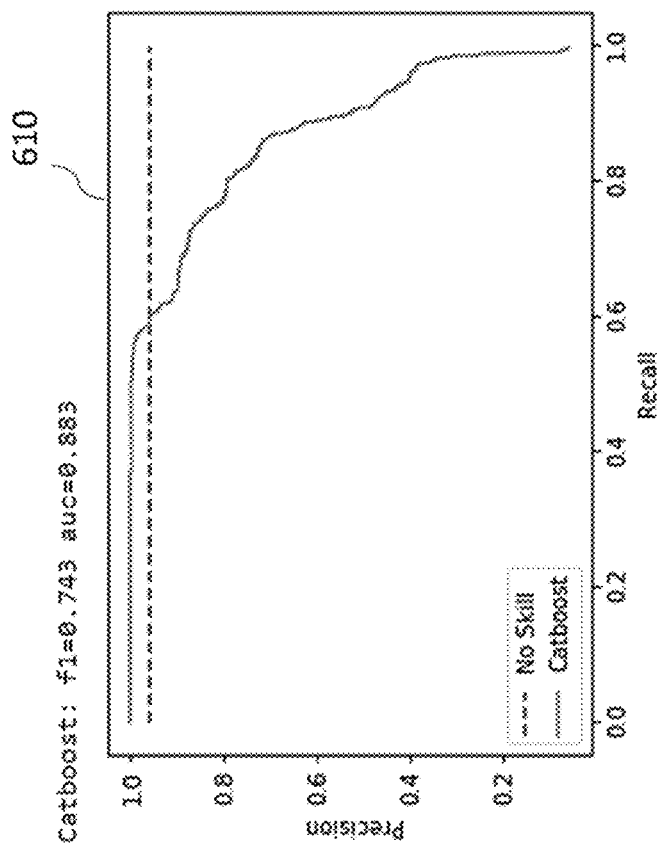

FIG. 6 shows the result of an experiment and evaluates the performance of the computerized-method for scaling automatic deployment of a machine learning detection model in a cloud-based managed analytics service by knowledge sharing, to overcome an imbalanced dataset learning problem, in accordance with some embodiments of the present disclosure.

F1 score is a harmonic mean of the precision and recall, where an F1 score reaches its best value at '1' i.e., perfect precision and recall. The accuracy metrics F1 score=0.743 in graph 610 and F1 score=0.815 in graph 620 and Area under the Curve (AUC)=0.883 in graph 610 and AUC=0.929 in graph 620 are used for evaluating of the performance of the machine learning detection model on both train and test sample.

In the results shown in graph 610 of a machine learning detection model which has been trained on train sample from a primary client and has been evaluated on test data of primary client, the F1 score and AUC result on test data are: F1=0.743 and AUC=0.883. In the results shown in graph 620, of a machine learning detection model which has trained on train data from train sample of primary client along with synthetic fraud data produced from second client and evaluated on test data of primary client, the F1 score and AUC result on test data are F1=0.815 and AUC=0.929.

The results shown in graphs 610 and 620 show a clear improvement in the primary client model performance using synthetic fraud data produced by CTGAN model for second client. F1 score in graph 620 is closer to '1' and the AUC is higher than the results shown in graph 610. Also, true positives for fraud detection named detection rate are improving from 62.55% to 73.44%, an improvement of around 10% from the results shown in graph 610 to the results shown in graph 620.

Figure 7:
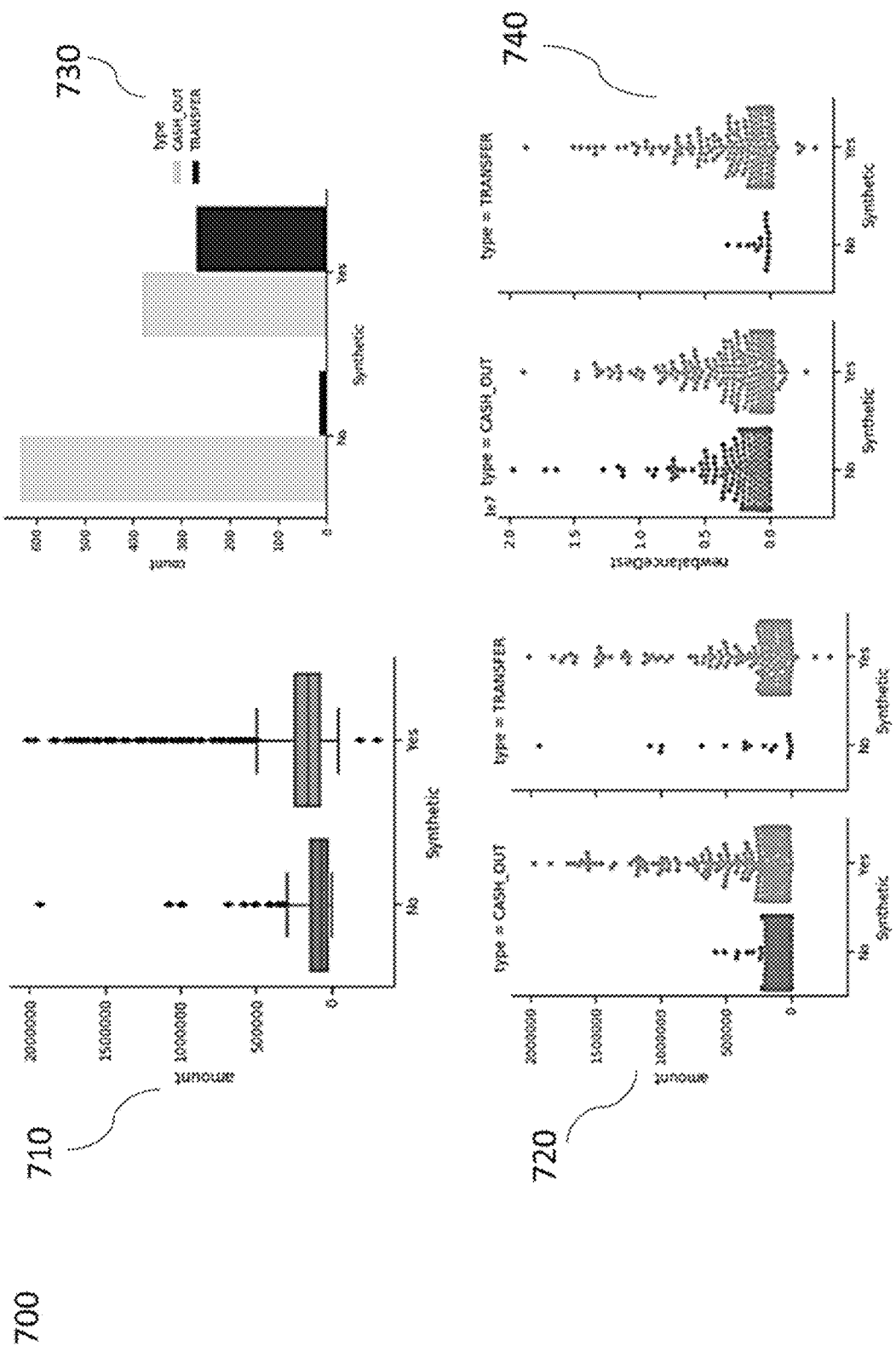
FIG. 7 shows results of a comparison of synthetic data vs original data, in accordance with some embodiments of the present disclosure.

FIG. 7 shows results of a comparison of synthetic data vs original data, in accordance with some embodiments of the present disclosure.

According to some embodiments of the present disclosure, graph 710 shows a comparison between prediction results of a machine learning detection model on original data marked as "no" and original data combined with synthetic data generated by CTGAN, marked as "yes". The results are per the amount of transactions in general. The usage of original data combined with synthetic data generated by CTGAN fills the gaps.

According to some embodiments of the present disclosure, graph 720 shows a comparison between prediction results of a machine learning detection model on original data marked as "no" and original data combined with synthetic data generated by CTGAN marked as "yes". The results are per the amount of transactions per transaction type: cash withdrawal marked as "cash_out" and money transfer marked as "transfer". The usage of original data combined with synthetic data generated by CTGAN fills the gaps.

According to some embodiments of the present disclosure, graph 730 shows a comparison between two transaction types: cash withdrawal marked as "cash_out" and money transfer marked as "transfer". When synthetic data is not combined marked as "no" there is significantly more cash_out transactions than transfer transactions. When synthetic data is combined with the original data there is almost an equality in the amount of cash_out transactions and transfer transactions.

According to some embodiments of the present disclosure, graph 740 shows that for transaction type "cash_out" the synthetic data does not destroy the pattern of the data but only fills the gaps and same for transaction type "transfer".

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for scaling automatic deployment of a machine learning detection model in a cloud-based managed analytics service by knowledge sharing, to overcome an imbalanced dataset learning problem, said computerized-method comprising:

a computerized system comprising a processor, a database, and a memory;
a plurality of client computers each comprising an on-prem cloud-based managed analytics service;
  wherein the on-prem cloud-based managed analytics services continuously monitor criminal typologies and operating fraud and Anti-Money Laundering (AML) model performance;
a storage comprising a consortium shared synthetic data lake,
  wherein the storage is remote from the computerized system and the plurality of client computers,
  wherein the consortium shared synthetic data lake comprises differential privacy data received from the computerized system,
  wherein the differential privacy data excludes any individual personal details,
the computerized system:
receiving financial transaction data from an associated on-prem cloud-based managed analytics service,
determining fraudulent financial transaction data in the received financial transaction data;
generating, by machine learning models at the computerized system, new differential privacy data by synthesizing patterns of the fraudulent financial transaction data;
  wherein the new differential privacy data excludes any individual personal details,
  wherein the synthesized patterns are at least one of: fraud patterns or AML patterns;
storing the new differential privacy data in the database of the computerized system;
updating the consortium shared synthetic data lake by adding the new differential privacy data to the consortium shared synthetic data lake;
creating a packaged machine learning detection model, by the processor of the computerized system, based on (i) the received financial transaction data and (ii) data obtained from the updated consortium shared synthetic data lake,
  wherein the data obtained from the updated consortium shared synthetic data lake comprises differential privacy data associated with financial transaction data from at least one different client;
deploying the packaged machine learning detection model on-prem of the client of the associated on-prem cloud-based managed analytics service.

2. The computerized-method of claim 1, wherein the synthesized patterns are related to financial crime.

3. The computerized method of claim 1, wherein the machine learning models to synthesize the patterns are Conditional Table Generative Adversarial Networks (CT-GAN).

4. The computerized method of claim 1, wherein creating the packaged the machine learning detection model includes the steps of: (i) data validation; (ii) data preprocessing: (iii) data enrichment; (iv) data sampling; (v) feature engineering; (vi) model tuning and training; (vii) model testing; and (viii) model packaging.

5. The computerized-method of claim 4, wherein the data obtained from the updated consortium shared synthetic data lake is used in the data enrichment phase.

* * * * *